United States Patent [19]
Atanasoski et al.

[11] Patent Number: 5,316,405
[45] Date of Patent: May 31, 1994

[54] CYCLONE SEAL EXPANSION JOINT

[76] Inventors: Josif Atanasoski; George Atanasoski, both of 130 River Lane Dr., Ormond Beach, Fla. 32075

[21] Appl. No.: 968,505

[22] Filed: Oct. 29, 1992

[51] Int. Cl.⁵ ............................................. F16J 15/02
[52] U.S. Cl. ...................................... 403/28; 403/51; 277/236; 285/200
[58] Field of Search ................... 403/24, 28, 29, 30, 403/50, 51; 277/212 FB, 236; 285/46, 200

[56] References Cited

U.S. PATENT DOCUMENTS

| | | | |
|---|---|---|---|
| 2,709,629 | 5/1955 | Ledinegg | 309/29 |
| 2,871,038 | 1/1959 | Comery | 286/10 |
| 2,946,609 | 7/1960 | Comery | 286/10 |
| 3,008,740 | 11/1961 | Hinkle, Jr. | 286/11.16 |
| 3,097,536 | 7/1963 | Young | 403/51 |
| 3,694,882 | 10/1972 | Desmond | 29/156.8 R |
| 4,103,905 | 8/1978 | Desmond et al. | 277/56 |
| 4,162,077 | 7/1979 | Crow et al. | 277/53 |
| 4,712,938 | 12/1987 | Seshamani et al. | 403/24 |
| 5,046,745 | 9/1991 | Sweetland et al. | 277/212 FR |

FOREIGN PATENT DOCUMENTS

| | | | |
|---|---|---|---|
| 0819466 | 4/1981 | U.S.S.R. | 403/50 |
| 1454260 | 11/1972 | United Kingdom | 403/28 |
| 2082109 | 3/1982 | United Kingdom | 403/28 |

Primary Examiner—P. Austin Bradley
Assistant Examiner—Erik R. Puknys
Attorney, Agent, or Firm—Edward M. Livingston

[57] ABSTRACT

A cyclone expansion seal joint assembly for use in interfacing components having differing thermal properties and conditions such as that in power plant, said joint formed of connecting sections (12), each having a series of corrugated plates (4, 8), interspersed between substantially "U"-shaped expansion joints (5, 9), mounted perpendicularly to an inner edge (19, 21) and outer edge (20, 22) of each corrugated plate. The inner and outer perimeters of the assembly may have flanges (6, 10) for attachment to components (3, 7) of the power plant. The sections (12) may be combined to form any predetermined shape and size depending on the particular application.

10 Claims, 2 Drawing Sheets

CYCLONE SEAL EXPANSION JOINT

BACKGROUND OF THE INVENTION

This invention relates to seal expansion joints, more particularly, to a cyclone seal expansion joint to interface between components or sections of differing temperatures and expansion/contraction properties.

At power plants it is often necessary to interface various components or sections having different temperatures, such as between or around a boiler and a connecting pipe. In such cases, the interface must be sealed so that liquid or steam from one section or pipe does not leak. A problem arises in maintaining a seal around and between such components due to different temperatures between the sections. The seal joint contracts and expands differently on each side, and even in a radial direction, thereby causing an imperfect seal, resulting in leaks from the component and resultant loss of output from the power plant. Thus, a need exist for a seal expansion joint that solves the above problems.

The prior patented art does include some prior expansion seals, but none has the same structure as the present invention. For instance, the closest patent in the prior art is U.S. Pat. No. 4,712,938 by Seshamani, et al., issued Dec. 15, 1987, which does disclose an expansion seal assembly using a corrugated plate between two members to accommodate thermal expansion. However, such device does not provide for radial expansion, nor does it have the same structure as the present invention. U.S. Pat. No. 3,694,882 by Desmond, issued Oct. 3, 1972, teaches the use of corrugated seals in multiple layers to form a liquid seal on a turbine. U.S. Pat. No. 4,162,077 by Crow, et al., issued Jul. 24, 1979 teaches a channel seal formed of a honeycomb cylindrical surface. U.S. Pat. No. 4,103,905 by Desmond, et al., issued Aug. 1, 1978, teaches a wavy seal arrangement for a steal turbine using corrugated uprights. U.S. Pat. No. 2,946,609 by Comery, issued Jul. 26, 1960, also teaches use of a wavy corrugated seal. Another patent by Comery, U.S. Pat. No. 2,871,038, issued Jan. 27, 1959, teaches other labyrinth seals used in steam turbine engines. U.S. Pat. No. 3,008,740 by Hinkle, Jr., issued Nov. 14, 1961, teaches a kiln seal between cylindrical members in a communicating chamber. Finally, U.S. Pat. No. 2,709,629 by Ledinegg, issued May 31, 1955, teaches use of labyrinth packing for machinery.

Although prior patents may teach the use of corrugated wavy expansion seals, none anticipates or suggests an expansion seal joint consisting of a series of corrugated pieces dispersed between expansion joints to from any size or shape expansion joint.

SUMMARY OF THE INVENTION

A primary object of the present invention is to provide an expansion seal joint that allows thermal expansion and contraction in radial directions as well as all other directions.

Another object of the present invention is to provide an expansion seal joint that while allowing thermal expansion and contraction, still maintains a seal to prevent leaks to prevent loss of system power at power plants and in other applications.

An even further object of the present invention is to provide such an expansion seal joint that can be made in almost any shaped or size by merely incorporating additional expansion sections.

The present invention fulfills the above and other objects by providing an expansion seal assembly having one or more corrugated plates interspersed between outwardly protruding "U"-shaped expansion joints connected to the inner and outer edges of each corrugated plate. Multiple sections of the corrugated plates with expansion joints are connected to form a predetermined geometric shape depending the application. In the latter manner this expansion joint will allow for expansion and contraction in all directions from the center of the geometric shape. The expansion seal joint may preferably be circular which would provide for expansion and contraction in the radial directions. The expansion seal may also have flanges on its in or outer edges for attachment purposes. This expansion seal joint may also have openings therein to allow a conduit to run therethrough. Further, as set forth herein, the expansion seal assembly may be almost any size or shape depending on the shape and arrangement sections of corrugated plate and expansion joint connection.

Other objects, features and advantages of the expansion seal joint will become more readily apparent when a preferred embodiment is discussed in conjunction with the drawings hereinafter.

BRIEF DESCRIPTION OF THE DRAWINGS

This invention is described by appended claims in relation to a description of a preferred embodiment with reference to the following drawings wherein:

DESCRIPTION OF PREFERRED EMBODIMENT

Figure 1:
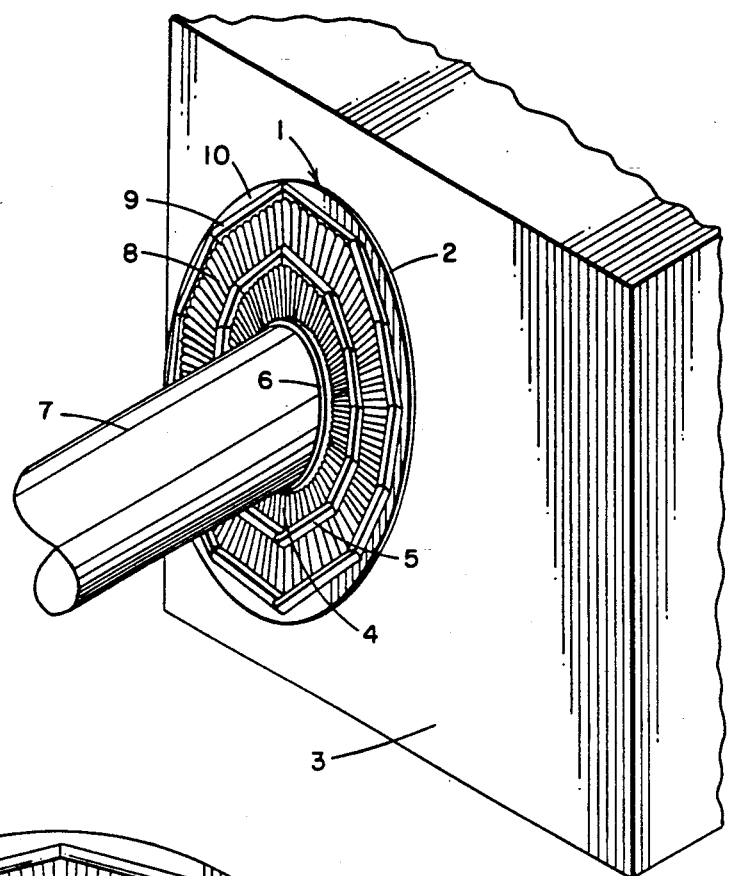
FIG. 1 is a perspective view of the cyclone expansion seal in use as a seal between a boiler and conduit.
Figure 2:
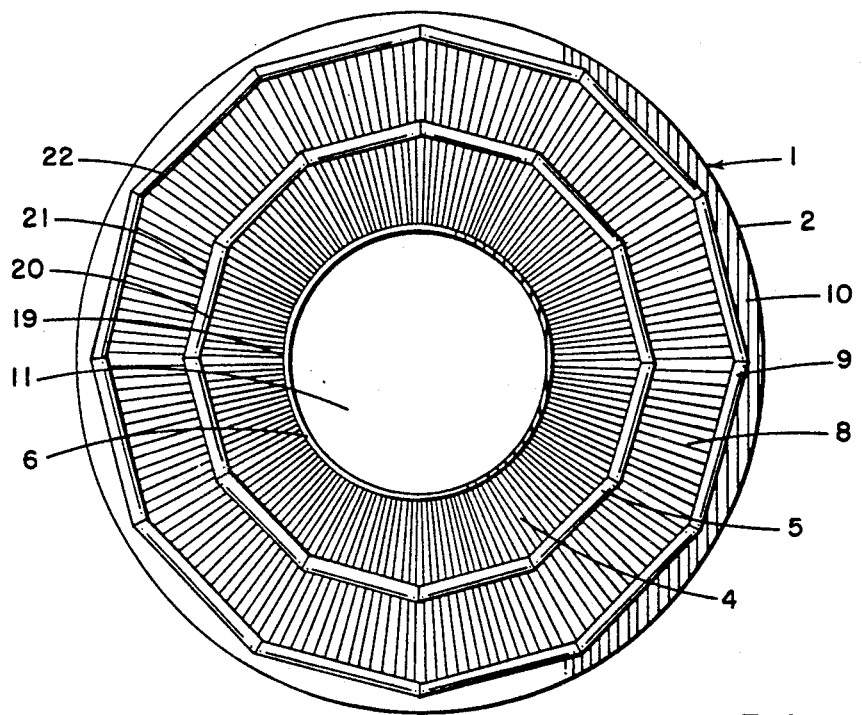
FIG. 2 is a front view of the cyclone expansion seal by itself.

Referring now to the drawings, FIGS. 1 and 2, the cyclone expansion seal joint assembly, which is the invention generally noted by numeral 1, is shown in a circular embodiment. The cyclone expansion seal joint 1, shown being applied to seal a boiler 3 around a duct or conduit 7 passing through a central opening 11, may contain an inner seal plate or flange 6 surrounding the conduit 7 in FIG. 1 or opening 11 in FIG. 2. Surrounding the flange 6 are multiple sections of corrugated plate 4 connected at the outer edges 20 by perpendicularly-attached "U"-shaped expansion joints 5.

An outer section of corrugated plates 8 is attached outward of the inner "U"-shaped expansion joints 5 in sections, which in turn is surrounded by an outer ring of "U"-shaped expansion joints 9. An outer seal plate or flange 10, which would have a perimeter or circumference in the geometric shape of the desired expansion seal assembly, surrounds the outer "U"-shaped expansion joints 9. The outer flange 10 provides means for attaching the entire expansion joint to a component by bolts or other connectors placed therethrough.

Figure 3:
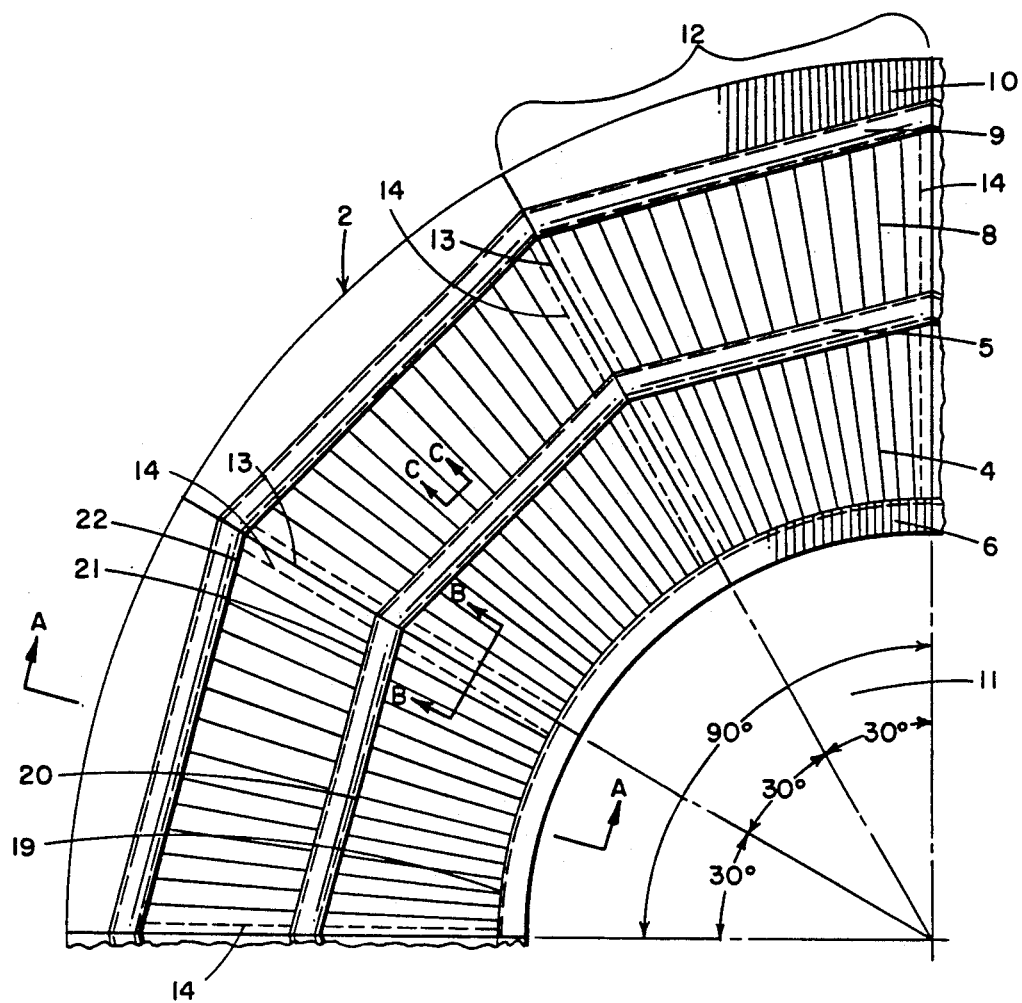
FIG. 3 is a detailed front view of a quarter section of the cyclone expansion seal.

Referring to FIG. 3, a quarter section of the expansion seal joint is illustrated which, as shown, forms thirty degrees (30°) of each quarter section. Each section 12 is fan shaped and is connected to adjoining sections by a plate (14 in FIG. 5) welded at each connection point 13. At final assembly a continuous seal weld is made between the sections at various locations, including at the inner seal plate 6, inner expansion joint 5, outer expansion joint 9, outer perimeter 2 and along the valley of corrugation 16 shown in FIG. 5. Ideally, in the case of a circular cyclone expansion seal joint, as illustrated herein, the expansion seal joint could be assembled in quarter sections at the place of the manufacture and then shipped in four quarter sections to a site of use for easy assembly with other quarter sections. However, this expansion seal joint may be made of many sections or segments which can be assembled to form the invention.

Figure 4:
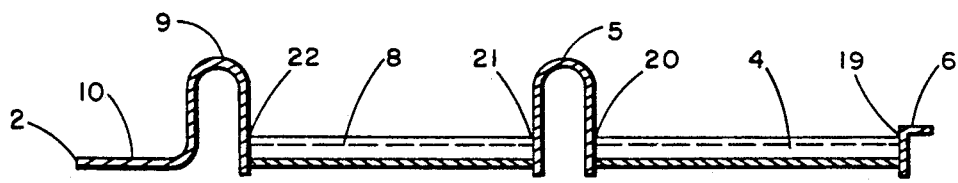
FIG. 4 is a cross-sectional view along lines A—A of FIG. 3.

FIG. 4 is a cross-sectional view along lines A—A showing the same features as previously described, the inner corrugated expansion plate 4 connected to the flange 6 at its inner edge 19 and to an outwardly protruding "U"-shaped expansion joint 5 at its outer edge 20. A second outer corrugated expansion plate 8 is connected at its inner edge 21 to said "U"-shaped expansion joints and at its outer edge to a second "U"-shaped expansion joint 9 which in this figure has a flange 10 and outer perimeter 2.

Figure 5:
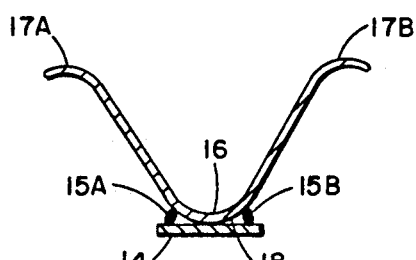
FIG. 5 is a cross-sectional view along B—B of FIG. 3 showing the connection of the corrugated plate sections of the expansion seal.

Referring to FIG. 5, the connection joint 13 of corrugation sections is illustrated. Like other corrugations, it has a valley 16 and two peaks 17a and 17b on each side of the valley. As illustrated, the corrugation is securely attached to a connection plate 14 by spot welds 15a and 15b and continuous weld at the valley 16.

Figure 6:
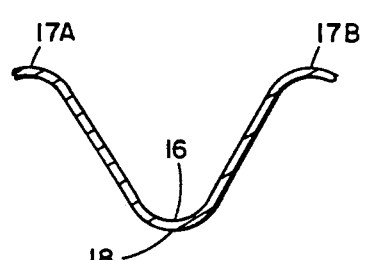
FIG. 6 is a cross-sectional view along lines C—C of FIG. 3 showing one corrugation of the expansion seal.

The final drawing, FIG. 6, shows a standard corrugation section having a bottom 18, valley 16 and peaks 17a and 17b on each side of the valley.

As described and illustrated, a circular or cyclone expansion seal joint could expand and contract in response to differing thermal conditions in all directions. For instance, in response to an increase in temperature the corrugated expansion plates 4 and 8 would contract to provide a shorter distance between the peaks of 17a and 17b of each corrugation and at the same time the "U"-shaped expansion joints 5 and 9 would contract to maintain the seal of the expansion seal joint. In the event of cooling, the sections of corrugated plates 4 and 8 and the expansion joints 5 and 9, would open wider so that the expansion seal would remain the same size and maintain the seal around the components.

Utilization of this expansion seal joint will be most prevalent in power plants, such as between a boiler and a conduit, or other location wherein components having different thermal conditions and different thermal properties are connected to each other. The expansion seal joint would be most preferably made of a metal having high heat conductivity, such as steel or aluminum. However, such an cyclone expansion seal could be made of resilient plastic or other material for applications in which expansion and contraction due to varying thermal or even pressure conditions exists.

It should be apparent as described and illustrated herein that a new expansion seal joint assembly has been disclosed which allows expansion seals to be made in almost any size and shape by changing the shape and number of sections of corrugated plates and connecting expansion joints making up the seal joint.

Although only one embodiment of the present invention has been described and illustrated in detail herein above, all modifications and improvements within the scope or equivalents of the claims are covered by this invention.

Having thus described our invention, we claim the following:

1. A radial expansion seal joint assembly for connecting components under differing thermal conditions, said assembly comprising;
   multiple sections of corrugated plates dispersed radially between outwardly protruding "U"-shaped expansion joints attached perpendicularly to inner and outer edges of said plates to form a predetermined shape to allow for movement due to thermal expansion and contraction, the outer edge of said plates being wider than the inner edge.

2. The expansion seal joint assembly of claim 1 wherein the predetermined shape is circular to provide movement due to thermal expansion contraction in a radial direction.

3. The expansion seal joint assembly of claim 2 wherein the sections of corrugated plates surround a central opening.

4. A radial expansion seal joint assembly for connecting components under differing thermal conditions, said assembly comprising:
   a first corrugated plate having radially dispersed corrugations extending from an inner edge to an outer edge which is wider than the inner edge;
   a first "U"-shaped expansion joint protruding perpendicularly from and connected to the outer edge of the first corrugated plate;
   a second and outer corrugated plate connected to the first "U"-shaped expansion joint; and
   a second "U"-shaped expansion joint protruding perpendicularly from and connected to an outer edge of the second outer corrugated plate wherein said plate and joints form sections connected together to form an expansion joint of a predetermined geometric shape.

5. The expansion seal joint assembly of claim 4 wherein the first corrugated plate has a flange on its inner edge.

6. The expansion seal joint assembly of claim 4 or 5 wherein the second "U"-shaped expansion joint has a flange on its outer edge.

7. The expansion seal joint assembly of claim 4 in which the predetermined shape is a circle.

8. The expansion seal joint assembly of claim 7 in which the assembly contains openings to allow conduits to pass through.

9. The expansion seal joint assembly of claim 1 or 4 wherein the sections are connected together by attachment to flat plates running along an intersection between the said sections.

10. A radial expansion seal joint assembly for connecting components exposed to differing thermal conditions, said assembly comprising:
    radially expandable and contractible sections of material radially dispersed about a central opening, each section having multiple corrugated plates connected by "U"-shaped expansion joints perpendicularly attached between each corrugated plate so as to provide directional movement in response to thermal changes and still maintain a seal between components.

* * * * *